(12) United States Patent
Bae

(10) Patent No.: US 7,957,497 B2
(45) Date of Patent: Jun. 7, 2011

(54) CLOCK AND DATA RECOVERY CIRCUITS USING RANDOM EDGE SAMPLING AND RECOVERY METHOD THEREFOR

(75) Inventor: Seung-Jun Bae, Daejeon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 736 days.

(21) Appl. No.: 11/938,810

(22) Filed: Nov. 13, 2007

(65) Prior Publication Data

US 2008/0130810 A1 Jun. 5, 2008

(30) Foreign Application Priority Data

Dec. 5, 2006 (KR) ........................ 10-2006-0122267

(51) Int. Cl.
*H04L 7/00* (2006.01)
(52) U.S. Cl. ...................................................... 375/355
(58) Field of Classification Search ................... 327/298; 375/295, 355, 362, 371, 375
See application file for complete search history.

(56) References Cited

U.S. PATENT DOCUMENTS

| | | | |
|---|---|---|---|
| 5,539,784 A | | 7/1996 | Brauns et al. |
| 6,737,904 B1 * | | 5/2004 | Butaud et al. ................. 327/298 |
| 7,079,589 B1 * | | 7/2006 | Maksimovic et al. ........ 375/295 |
| 7,522,687 B2 * | | 4/2009 | Cranford et al. .............. 375/355 |
| 2003/0123498 A1 | | 7/2003 | Ishino |
| 2004/0208270 A1 | | 10/2004 | Schmatz et al. |
| 2006/0050827 A1 * | | 3/2006 | Saeki et al. .................... 375/362 |

FOREIGN PATENT DOCUMENTS

| | | |
|---|---|---|
| JP | 2001-136157 | 5/2001 |
| JP | 2004-242243 | 8/2004 |
| JP | 2005-086789 | * 3/2005 |
| KR | 10-2003-0018189 | * 3/2003 |
| KR | 10-2004-0004838 | * 1/2004 |
| KR | 1020040075243 | 8/2004 |

* cited by examiner

Primary Examiner — David C. Payne
Assistant Examiner — Leon-Viet Q Nguyen
(74) Attorney, Agent, or Firm — Volentine & Whitt, PLLC

(57) ABSTRACT

A clock and data recovery (CDR) circuit comprises a data sampling unit which latches serial data input in response to data clock signals, and outputs a plurality of sampling data, the data clock signals maintaining a constant phase difference and having mutually different phases, an edge sampling unit which outputs an edge sampling signal generated by sampling edge information of the serial data in response to a selection edge clock signal, the selection edge clock signal being randomly selected from among a plurality of edge clock signals, a data selection unit which selects at least two consecutive sampling data from among the plurality of sampling data, and a decoding unit which performs a logical operation of the sampling data selected by the data selection unit and the edge sampling signal.

17 Claims, 12 Drawing Sheets

CLOCK AND DATA RECOVERY CIRCUITS USING RANDOM EDGE SAMPLING AND RECOVERY METHOD THEREFOR

BACKGROUND AND SUMMARY

1. Field of the Invention

The present disclosure relates to a clock and data recovery circuit and a method of recovering clock and data from a received signal and, more particularly, to circuits and methods of clock and data recovery which perform random edge sampling every predetermined number of data periods.

A claim of priority is made under 35 U.S.C. §119 from Korean Patent Application 10-2006-0122267, filed on Dec. 5, 2006, the contents of which are hereby incorporated by reference in their entirety.

2. Description of the Related Art

Two types of communication methods are predominantly used in the communication industry. These two communication methods are serial communications and parallel communications. Serial communication methods use serial interface devices to conduct serial communication. Similarly, parallel communication methods use parallel interface devices to conduct parallel communication. In general, a serial interface device is more popular than a parallel interface device in a high speed communications. This is because a maximum transmission distance and speed are limited in the parallel interface device due factors such as, for example, crosstalk, noise coupling, etc., between respective bits of transmitted and received data.

Serial interface devices may be used to transmit and receive data configured for parallel communication. In particular, the serial interface device converts parallel type data into a serial type and transmits it. Furthermore, the serial interface device may also be configured to receive serial data that includes parallel data information and then converts it into parallel information.

Unlike a parallel interface device that transmits clock and data simultaneously and individually, the serial interface device transmits only a data signal. This data signal transmitted by the serial interface device includes clock information. In particular, a transmitting serial interface device transmits a data signal by adding clock information to the data information and then transmitting the clock and data information in one data signal. Similarly, on the receiving end, a receiving serial interface extracts clock and data information from the received data. To this end, a clock and data recovery (CDR) circuit is generally used to perform a function of extracting clock and data from a data signal containing clock information.

FIG. 1 is a block diagram of a conventional clock and data recovery circuit. As shown in FIG. 1, a conventional CDR circuit includes a phase detector 10, a filter 20, and a voltage controlled oscillator (VCO) 30.

The phase detector 10 compares a phase of a data signal Data with a phase of a clock signal CLK generated in the VCO 30, and generates an error signal, that is, an Up signal or a Down signal.

The filter 20 may include a charge pump circuit, and receives the error signal. When the error signal is an Up signal, the filter 20 increases a level of a voltage control signal Vctrl, and when the error signal is a Down signal, a level of the voltage control signal Vctrl decreases.

The VCO 30 controls a phase of clock signal CLK according to a voltage level of voltage control signal Vctrl. When the level of the voltage control signal Vctrl increases, a phase or frequency of the clock signal CLK increases, and when the level of the voltage control signal Vctrl decreases, a phase or frequency of the clock signal CLK decreases.

The phase detector 10 reduces a phase difference between the data signal Data and the clock signal CLK by generating an error signal based on the phase difference between the data signal Data and the clock signal CLK. In particular, the phase detector 10 attempts to synchronize the data signal Data and the clock signal CLK.

FIG. 2 illustrates timing operations for a conventional data recovery procedure. As shown in FIG. 2, four bits of data are transmitted in one cycle of a reference clock signal CK. In order to recover data information from a received signal, two kinds of clocks are normally used. These clocks include a data clock Data0, Data1, Data2, Data3 positioned in a center of data and an edge clock Edge0, Edge1, Edge2, Edge3 for extracting edge information of data.

In general, when the data clock Data0, Data1, Data2, Data3, and the edge clock Edge0, Edge1, Edge2, Edge3 are generated successively, the phase difference between a successive data clock and edge clock is about half a data period. For example, a data clock Data0 and an edge clock Edge1 have a phase difference corresponding to a half of data period. Thus, when a phase of an edge clock is controlled so that the edge clock Edge0, Edge1, Edge2, Edge3 is precisely locked to a data edge, the data clock Data0, Data1, Data2, Data3 is always positioned dead center between data edges. That is, the data clock is positioned in the center portion of a data value. This may lead to a relatively large margin between the data clock and edge clock. Received data is then latched within a given interval by using the two kinds of clocks, and data latched by the data clock Data0, Data1, Data2, Data3 is output as effective data.

Beneficially, jitter generated in data may be reduced by extracting, in a real time, edge information every data period and by moving a phase of the clock signal according to the extraction result. However, the rate at which the phase of a clock may be changed is limited due delays in the feedback circuit shown in FIG. 1.

Therefore, phase information is extracted every data period, and the phase information for each data period is synthesized over several data periods. The phase change of the clock is decided based on this synthesized information. For example, as shown in FIG. 2, the phase change of clock is decided on the basis of phase information synthesized during four data periods.

The phase detector 10 shown in FIG. 1 can be realized as shown in FIGS. 3 to 5. The configuration and operation of a conventional phase detector will be now described under an assumption that the phase change of a clock will occur over four data periods.

Referring to FIG. 3, the phase detector 10 of the conventional CDR circuit includes four D-flip flops F0, F1, F2, and F3 for a data sampling, four D-flip flops F4, F5, F6, and F7 for an edge sampling, a decoder 12 and an adder 16.

Flip flops F0, F1, F2, and F3 latch input serial data with a given interval in response to each of data clock signals CLK_0, CLK_90, CLK_180, and CLK_270 having mutually different phases, thus generating sampling data Data0, Data1, Data2, and Data3.

The four D-flip flops F4, F5, F6 and F7 for the edge sampling operate in response to each of edge clock signals CLK_45, CLK_135, CLK_225, and CLK_315 having mutually different phases. Furthermore, the D-flip flops F4, F5, F6, and F7 latch edges of input serial data with a given interval in response to the edge clock signals CLK_45, CLK_135, CLK_225, and CLK_315, thus generating edge sampling signals Edge0, Edge1, Edge2, and Edge3.

In general, the decoder 12 receives sampling data Data0, Data1, Data2, Data3, and edge sampling signals Edge0, Edge1, Edge2, Edge3. Furthermore, the decoder 12 determines whether a transition of the sampling data Data0, Data1, Data2, Data3 is generated or not, and extracts edge information from the edge sampling signal Edge0, Edge1, Edge2, Edge3. This will be described in detail with respect to FIG. 4.

FIG. 4 is a circuit diagram of the decoder 12. The decoder 12 includes a plurality of XOR logic circuits XO12, XO14, XO16, XO18, XO20, XO22, XO24, and XO26, inverter circuits I12, I14, I16, I18, I20, I22, I24, and I26, and AND circuits A12, A14, A16, A18, A20, A22, A24, and A26.

The decoder 12 includes sub-decoder circuits 12a, 12b, 12c, and 12d corresponding to the number of the edge sampling signals Edge0, Edge1, Edge2, and Edge3. One sub-decoder circuit 12a will be provided as an example whose configuration and operation will be described as follows.

One sub-decoder circuit 12a selects two consecutive sampling data Data0 and Data1 and an edge sampling signal Edge0. Then, the sub-decider circuit 12a performs a logic operation on the selected sampling data and the edge sampling signal. In detail, when the selected sampling data Data0 and Data1 correspond to data clock signals CLK_0 and CLK_90, the edge sampling signal Edge0 corresponding to an edge clock signal CLK_45 that has a middle phase value of the data clock signals CLK_0 and CLK_90, is selected.

Furthermore, the two selected sampling data Data0 and Data1 are input to a first XOR circuit XO12. Circuit XO12 determines whether a transition was generated or not between the sampling data Data0 and Data1. For example, when a sampling data Data0 is '0' and a sampling data Data1 has '1' or vice versa, it is decided the transition was generated, but when the sampling Data0 and Data 1 have the same value, it is decided that the transition was not generated. In other words, when an output signal of first XOR circuit XO12 has a value of '1', it indicates a generation of transition, and when the transition is not generated, a hold signal Hold0 is generated.

When a transition is generated between the sampling data Data0 and Data1, the sampling data Data1 and the edge sampling signal Edge0 are logically operated on by a second XOR circuit XO14. Furthermore, edge information is extracted by performing a logic operation on the output signals of the second XOR circuit XO14 and the first XOR circuit XO12. In other words, the edge information is extracted by AND-operating output signals of the second XOR circuit XO14 and the first XOR circuit XO12, or by AND-operating an inverted signal of output signal of the second XOR circuit XO14 and an output signal of the first XOR circuit XO12. In particular, edge information as to whether an edge was precisely detected, is detected, through an output signal Early0 of the first AND circuit A12 that AND-operates output signals of the second XOR circuit XO14 and the first XOR circuit XO12, and through an output signal Late0 of the second AND circuit A14 that AND-operates an inverted signal of output signal of the second XOR circuit XO14 and an output signal of the first XOR circuit XO12. Specifically, this edge information is edge information between the sampling data Data0 and Data1. Similarly edge information between the rest sampling data, Data1 and Data2, Data2 and Data3, Data3 and Data0, is also detected through the other three sub-decoder circuits 12b-12d.

Transition information Hold0, Hold1, Hold2, Hold3 and edge information Early0, Early1, Early2, Early3, Late0, Late1, Late2, Late3 of the sampling data Data0, Data1, Data2, Data3, output from the decoder 12, are input to the adder 16 as shown in FIG. 3. The adder 16 determines a mean of the edge information, and decides a phase change direction of the data clock signal and the edge clock signal based on the determined mean of the edge information.

The configuration and operation of the adder 16 are will now be described referring to FIG. 5. The adder 16 includes a plurality of shifters S0, S1, S2, and S3, with a wiring structure as shown in FIG. 5.

As shown in FIG. 5, the shifters S0, S1, S2, and S3 each receive the transition information Hold0, Hold1, Hold2, Hold3, and edge information Early0, Early1, Early2, Early3, Late0, Late1, Late2, Late3, output from the decoder 12, and perform an addition thereof. When the edge information Early0, Early1, Early2, Early3, Late0, Late1, Late2, Late3 is input, the shifter S0, S1, S2, S3 shifts, by 1 bit, previously input information of '11110000'. For example, when edge information is input as Early0='1' Late='0', a $0^{th}$ shifter S0 shifts the information of '11110000' and outputs it as '11100000'. On the contrary, when edge information is input as Early0='0' Late='1', the $0^{th}$ shifter S0 outputs it as '11111000'.

The output from the last shifter S3 is logically operated on, and then the result is output. In particular, when an output of an inverter circuit 142 is '1', a phase of the clock becomes down, and when an output signal XO42 of an XOR circuit is '1', the phase is fixed, and when an up signal is generated, the phase of the clock becomes up. Furthermore, an output signal of the adder 16 is input to a voltage controlled oscillator 30 of FIG. 1, to control a phase of the clock.

As described above, a conventional CDR circuit extracts phase information every data period, and synthesizes the results over several data periods, and decides a phase change direction of the clock. However, the conventional CDR circuit has several limitations. For example, at high data transmission rates, the conventional CDR circuit must process data at a high speed for sampling data information and edge information. However, the sampling speed of a CDR circuit is limited by the operating speed of the internal components of the CDR circuit such as, for example, shifters, and logic gates. Therefore, in order to perform sampling at high speeds, the number of components may be to be increased. As the number of CDR circuits increases, a number of problems may occur. For example, the total current consumption for the CDR circuits may increase.

The present disclosure is directed towards overcoming one or more shortcomings of the conventional CDR circuits.

SUMMARY OF THE INVENTION

One aspect of the disclosure includes a clock and data recovery (CDR) circuit. The CDR circuit comprises a data sampling unit which latches serial data input in response to data clock signals, and outputs a plurality of sampling data, the data clock signals maintaining a constant phase difference and having mutually different phases, an edge sampling unit which outputs an edge sampling signal generated by sampling edge information of the serial data in response to a selection edge clock signal, the selection edge clock signal being randomly selected from among a plurality of edge clock signals, the plurality of edge clock signals maintaining a constant phase difference, having mutually different phases, and having phases individually different from the data clock signals, a data selection unit which selects at least two consecutive sampling data from among the plurality of sampling data, the at least two sampling data corresponding to the edge sampling signal output from the edge sampling unit, and a decoding unit which performs a logical operation of the sampling data selected by the data selection unit and the edge sampling signal, and outputs a transition information signal of the sampling data selected by the data selection unit and a phase control signal.

Another aspect of the disclosure includes a clock and data recovery method. The method comprises outputting an edge sampling signal generated by sampling edge information of serial data in response to a selection edge clock signal randomly selected from among a plurality of edge clock signals, the plurality of edge clock signals maintaining a constant phase difference and having mutually different phases, individually latching the serial data and outputting a plurality of sampling data, selecting at least two sampling data having a smallest phase difference from the edge clock signal from among the plurality of sampling data, performing a logical operation on the selected at least two sampling data and the edge sampling signal, and generating a transition information signal of the selected at least two sampling data and a phase control signal, and generating phase control signals to control one of an input phase of the serial data and phases of the edge clock signals and data clock signals.

Yet another aspect of the present disclosure includes a clock and data recovery method. The method comprises extracting edge information of input serial data using an interleaving scheme in response to an edge clock signal randomly generated every predetermined number of data periods.

BRIEF DESCRIPTION OF THE DRAWINGS

The present disclosure will become more fully understood from the detailed description given herein below and the accompanying drawings which are given by way of illustration only, and thus are not limitative of the present invention, and wherein.

DETAILED DESCRIPTION

Exemplary embodiments will now be described more fully hereinafter with reference to FIGS. 6 to 12. This invention may, however, be embodied in many different forms and should not be construed as limited to the embodiments set forth herein. Rather these embodiments are provided so that this disclosure will be thorough and complete, and will fully convey the scope of the invention to those skilled in the art.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Figure 6:
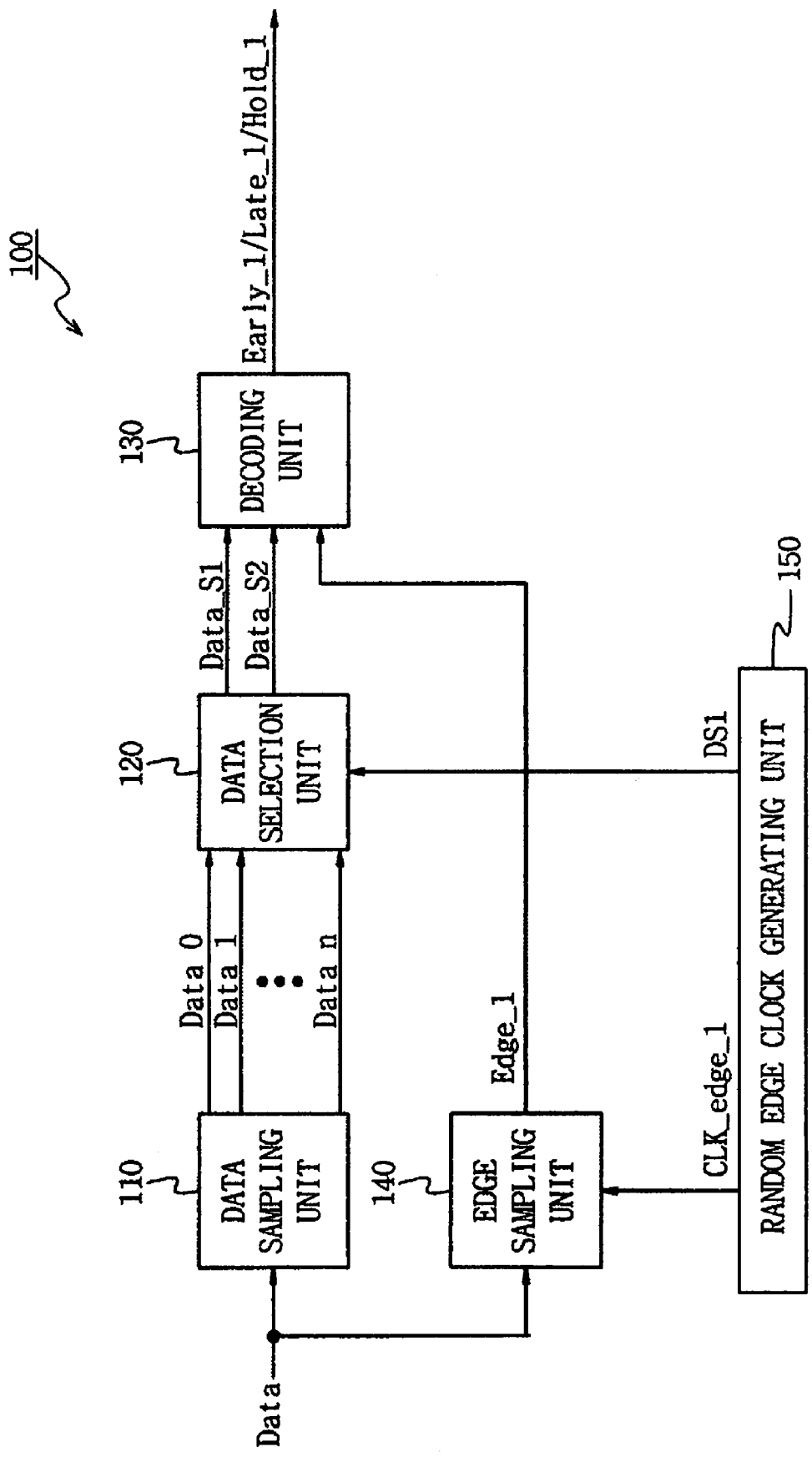
FIG. 6 is a block diagram of a CDR circuit according to an exemplary disclosed embodiment.

FIG. 6 is a block diagram of a CDR circuit according to an exemplary disclosed embodiment. Referring to FIG. 6, a CDR circuit 100 includes a data sampling unit 110, a data selection unit 120, a decoding unit 130, and an edge sampling unit 140. The circuit 100 also includes a random edge clock generating unit 150.

The data sampling unit 110 latches, with a given interval, serial data that are input in response to each of a plurality of data clock signals, the plurality of data clock signals maintaining a constant phase difference and having mutually different phases. Based on the latched serial data, the data sampling unit 110 then outputs a plurality of sampling data Data0 to Data n.

For example, in transmitting data of 4 bits in a period of a reference clock signal CK, the data clock signals may use four clock signals CLK_0, CLK_90, CLK_180 and CLK_270 having a phase difference of 90 degrees, and four sampling data are output by using the data clock signals. The data sampling unit 110 may include various latch circuits for latching data.

The edge sampling unit 140 outputs an edge sampling signal Edge_1 generated by sampling edge information of the serial data in response to a selection edge clock signal CLK_edge_1. The selection edge clock signal CLK_edge_1 is generated from the random edge clock generating unit 150. In an exemplary embodiment, the random edge clock generating unit 150 generates the selection edge clock signal CLK_edge_1 by randomly selecting an edge clock signal from among a plurality of edge clock signals every predetermined number of data periods. The plurality of edge clock signals provided to the unit 150 maintain a constant phase difference, have mutually different phases, and also have phases individually different from the data clock signals. The selection edge clock signal CLK_edge_1 is selected and generated in the random edge clock generating unit 150 and is input to the edge sampling unit 140.

For example, in transmitting data of 4 bits at a period of a reference clock signal CK, one edge clock signal CLK_edge_1 is randomly selected from among edge clock signals CLK_45, CLK_135, CLK_225, and CLK_315 having a phase difference of 45 degrees from the data clock signals CLK_0, CLK_90, CLK_180, and CLK_270, and is input to the edge sampling unit 140. In this case it is assumed that each selection edge clock signal CLK_edge_1 is selected every four data periods.

The edge sampling unit 140 outputs an edge sampling signal Edge_1 generated by sampling edge information of the serial data in response to the selection edge clock signal CLK_edge_1 input every four data periods.

The data selection unit 120 selects at least two sampling data from a plurality of sampling data Data0 to Data n, the at least two sampling data corresponding to the edge sampling signal Edge_1 output from the edge sampling unit 140 and being consecutive to each other. In selecting the sampling data, sampling data generated corresponding to a data clock signal having a smallest phase difference from a selection edge clock signal CLK_edge_1 to generate the edge sampling signal Edge_1, can be selected. For example, when the edge clock signal is an edge clock signal CLK_45 having a phase of 45 degrees, sampling data Data_S1, Data_S2 generated in response to data clock signal CLK_0, CLK_90 having a smallest phase difference from the edge clock signal CLK_45 is selected.

Figure 1:
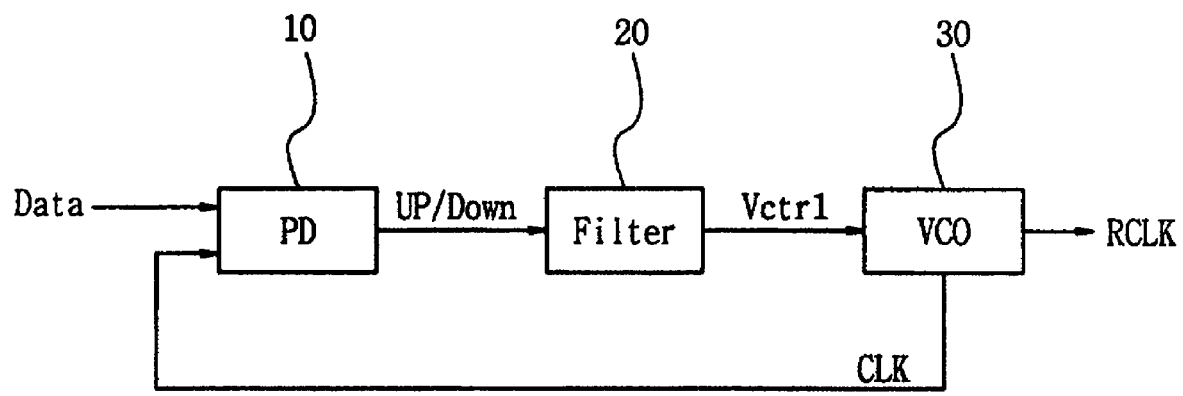
FIG. 1 is a block diagram of a conventional CDR circuit.

The decoding unit 130 logically operates on the sampling data Data_S1, Data_S2 selected in the data selection unit 120 and the edge sampling signal Edge_1, and outputs a transition information signal Hold_1 of the sampling data Data_S1, Data_S2 and a phase control signal Early_1, Late_1 for edge information. The phase control signal Early_1, Late_1 controls phases of the data clock signals CLK_0, CLK_90, CLK_180, and CLK_270 and the edge clock signals CLK_45, CLK_135, CLK_225, and CLK_315. That is, the phase control signals are input to a separate PLL circuit or voltage controlled oscillator shown in FIG. 1, to control phases of the data clock signals CLK_0, CLK_90, CLK_180, and CLK_270 and phases of the edge clock signals CLK_45, CLK_135, CLK_225, and CLK_315. Furthermore, the phase control signal Early_1, Late_1 is input to a controller of a semiconductor device employing the CDR circuit 100, to control an input phase of the serial data. In other words, data can be recovered by maintaining intact phases of the data clock signals CLK_0, CLK_90, CLK_180, and CLK_270 and the edge clock signals CLK_45, CLK_135, CLK_225, and CLK_315 and by controlling an input speed of the serial data.

Figure 7:
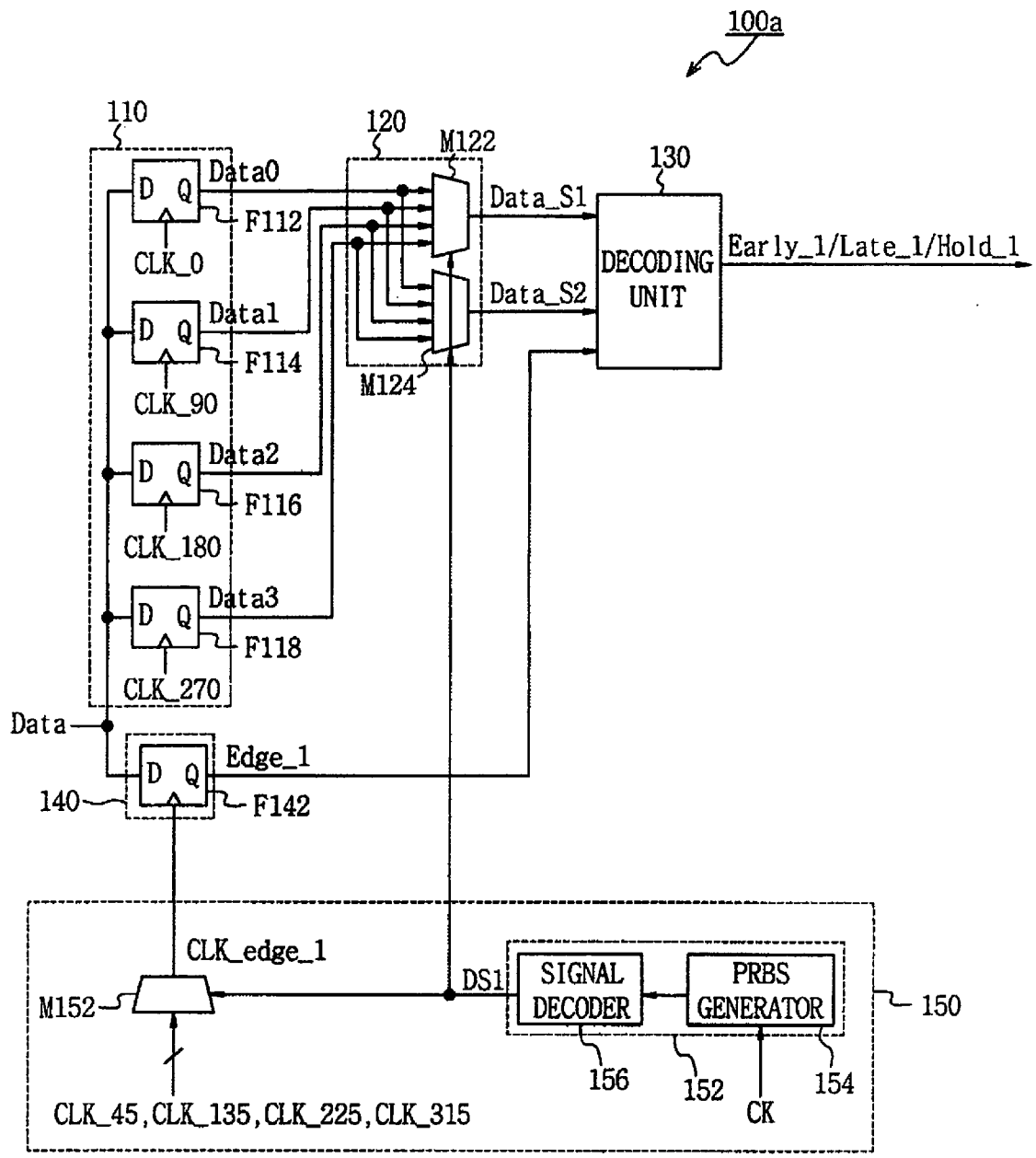
FIG. 7 is a circuit diagram of the CDR circuit shown in FIG. 6.

FIG. 7 is a circuit diagram of the circuit 100a realized from the clock and data recovery circuit shown in FIG. 6. Though FIG. 7 just provides an example for FIG. 6, for the sake of convenience, the same reference numbers and characters are provided for respective blocks.

In the example of FIG. 7, serial data of four bits is transmitted every cycle of a reference clock signal CK, and each one edge clock signal CLK_edge_1 is randomly selected during that time.

As shown in FIG. 7, the data sampling unit 110 includes four D flip-flops F112, F114, F116, and F118, which respectively operate in response to each of data clock signals CLK_0, CLK_90, CLK_180, and CLK_270 having mutually different phases. The data sampling unit 110 latches, with a 90 degree phase interval, data transmitted (inputted) in response to each of data clock signals CLK_0, CLK_90, CLK_180, and CLK_270, and then performs a sampling for them. The D flip-flops F112, F114, F116, and F118 individually output each of four sampling data Data0, Data1, Data2, and Data3.

The edge sampling unit 140 outputs an edge sampling signal Edge_1 generated by sampling edge of the serial data Data in response to a selection edge clock signal CLK_edge_1 selected and output from the random edge clock generating unit 150. The edge sampling unit 140 may be realized as one D flip-flop F142 responding to the selection edge clock signal CLK_edge_1.

The random edge clock generating unit 150 randomly selects one selection edge clock signal CLK_edge_1 every predetermined number of data periods (for example, every four data periods) from among the edge clock signals CLK_45, CLK_135, CLK_225, and CLK_315. To this end, the random edge clock generating unit 150 includes a randomizer 152 and a multiplexer circuit M152.

The randomizer 152 generates an edge clock signal DS1 to randomly generate each one selection edge clock signal CLK_edge_1 every predetermined number of data periods. The randomizer 152 includes a PRBS (Pseudo Random Binary Sequence) generator 154 that is called a random data generator or data pattern generator, and a signal decoder 156.

The PRBS 154 randomly generates binary codes, and randomly generates herein each of 2 bit signal for every one period of a reference clock signal CK. When the selection edge clock signal CLK_edge_1 is selected from eight clock signals and not from four, the PRBS generator 154 randomly generates a 3 bit signal.

The signal decoder 156 outputs an edge clock selection signal DS1 generated by decoding a binary code generated in the PRBS generator 154. The multiplexer circuit M152 selects one edge clock signal from four edge clock signals CLK_45, CLK_135, CLK_225, and CLK_315 input in response to the edge clock selection signal DS1, and outputs selection edge clock signal CLK_edge_1.

The data selection unit 120 includes multiplexer circuits M122 and M124 for selecting at least two sampling data Data_S1 and Data_S2 generated in response to each of at least two data clock signals that have the smallest phase difference from the selection edge clock signal CLK_edge_1. That is, the multiplexer circuits M122 and M124 select two sampling data Data_S1 and Data_S2 in response to the edge clock selection signal DS1.

For example, when the selection edge clock signal CLK_edge_1 is an edge clock signal CLK_45 having a phase of 45 degrees, data clock signals having a smallest phase difference from the edge clock signal CLK_45 are a data clock signal CLK_0 having a phase of 0 degrees and a data clock signal CLK_90 having a phase of 90 degrees. Sampling data Data0, Data1 generated in response to these data clock signals are selected by the data selection unit 120.

For example, when the selection edge clock signal CLK_edge_1 is an edge clock signal CLK_135 having a phase of 135 degrees, sampling data Data1 and Data2 are selected, and when the selection edge clock signal CLK_edge_1 is an edge clock signal CLK_225 having a phase of 225 degrees, sampling data Data2 and Data3 are selected. Also, when the selection edge clock signal CLK_edge_1 is an edge clock signal CLK_315 having a phase of 315 degrees, sampling data Data3 and Data0 are selected and are output as sampling data Data_S1 and Data_S2.

Figure 8:
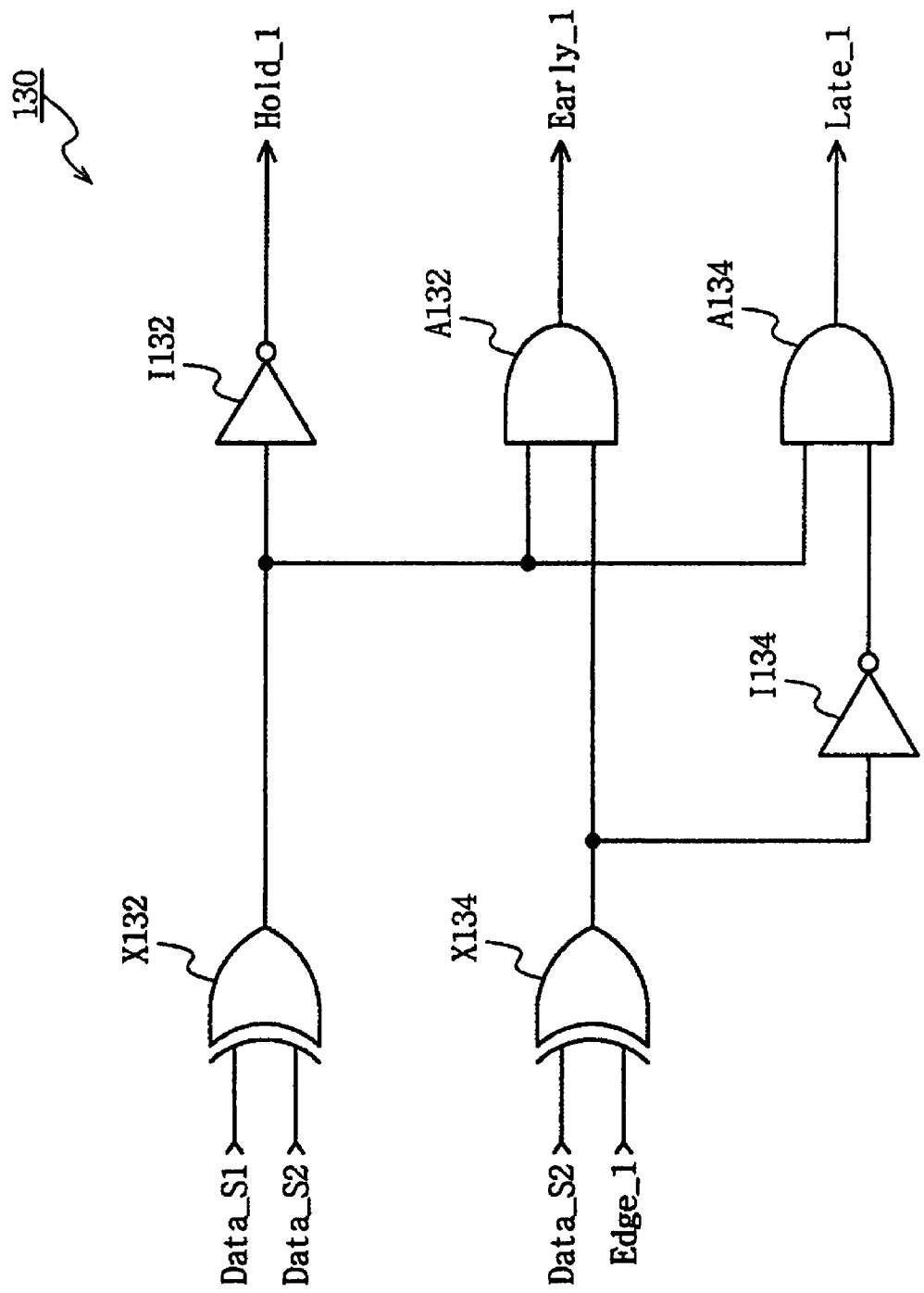
FIG. 8 is a circuit diagram of a decoding unit shown in FIG. 7.

An exemplary embodiment of decoding unit 130 is disclosed in FIG. 8. As shown in FIG. 8, the decoding unit 130 includes a first XOR circuit X132, a second XOR circuit X134, a first AND circuit A132, a second AND circuit A134 and inverter circuits I132 and I134.

The first XOR circuit X132 outputs a result obtained by performing a logical operation of at least two sampling data Data_S1 and Data_S2 selected in the data selection unit 120. In other words, when data values of the sampling data Data_S1 and Data_S2 have different values, '1' is output, and when having the same value, '0' is output. Thus, a decision is made as to whether successive sampling data Data_S1 and Data_S2 are transited.

The second XOR circuit X134 logically operates any one sampling data Data_S2 of the at least two sampling data Data_S1 and Data_S2 selected by the data selection unit 120, and the edge sampling signal Edge_1, and outputs its result. In other words, when the sampling data Data_S2 and the edge sampling signal Edge_1 have different values, '1' is output, and when having the same value, '0' is output.

The first AND circuit A132 logically operates an output signal of the first XOR circuit X132 and an output signal of the second XOR circuit X134, and output a first phase control signal Early_1. In an exemplary embodiment, when the first phase control signal Early_1 has a value of '1', it may mean that a phase is faster/slower as compared with input data.

The second AND circuit A134 logically operates an output signal of the first XOR circuit X132 and an inverted signal of an output signal of the second XOR circuit X134, and outputs a second phase control signal Late_1. To this end, the decoding unit 130 may further include an inverter circuit I134.

When the second phase control signal Late_1 has a value of '1', it may mean that a phase is slower/faster in comparison with input data. The inverter circuit I132 inverts an output signal of the first XOR circuit X132, and outputs a hold signal Hold_1 having transition information of sampling data Data_S1, Data_S2. In an exemplary embodiment, when the hold signal Hold_1 has a value of '1', it may indicate that transition did not occur between the selected sampling data Data_S1 and Data_S2, and when having a value of '0', it may indicate that the transition was generated. In addition, the phase control signals Early_1 and Late_1 may be synthesized and used through an adder 16 shown in FIG. 3.

As described above, edge information is extracted continuously every data period in a conventional art, but according to some embodiments of the invention, edge information is extracted every predetermined number of data periods (for example, every N number of data periods), thereby reducing a current consumption to 1/N as compared with the conventional art.

The disclosed system may not adversely affect the performance of clock data recovery. For example, the amount of information extracted is small as compared with the conventional art. However, this may not have a negative impact on performance of the CDR. For example, a mean value of edge information for 100 periods may be almost the same as a mean value of edge information for 25 periods randomly extracted as ¼ of the 100 periods. Therefore, the existing performance can be kept by reducing the number of edge sampling and substantially reducing a power consumption of the CDR circuit.

Figure 9:
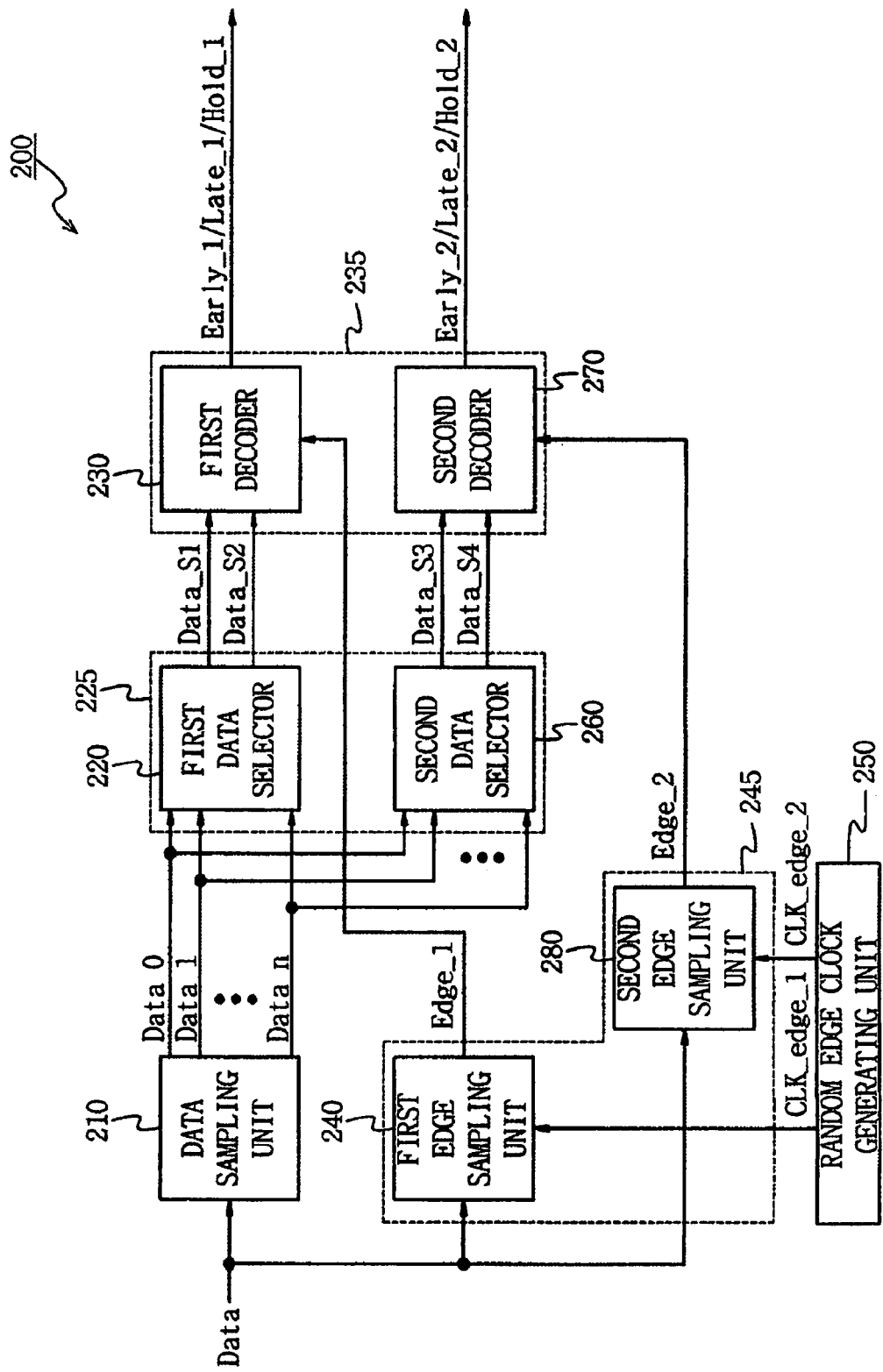
FIG. 9 is a block diagram of a CDR circuit according to an alternative exemplary disclosed embodiment.

FIG. 9 is a block diagram of a clock and data recovery circuit according to alternative exemplary disclosed embodiments. In the clock and data recovery circuit shown in FIG. 6, when successive edge clock signals are selected, a selected edge clock signal may become too high in a clock frequency and so a difficulty in operation may be caused. For example, when as selection edge clock signal CLK_edge_1, a phase clock signal CLK_315 having a phase of 315 degrees is selected for four data periods, and a phase clock signal CLK_45 having a phase of 45 degrees is selected for next four data periods, and then when the signals are applied to one edge sampler F142, a problem in the operation of the CDR circuit may be caused. This problem may be resolved in an alternative exemplary embodiment disclosed in FIG. 9.

As shown in FIG. 9, a clock and data recovery circuit 200 according to an alternative exemplary embodiment includes a data sampling unit 210, a data selection unit 225, an edge sampling unit 245 and a decoding unit 235. The circuit 200 further includes a random edge clock generating unit 250.

The data sampling unit 210 each latches, with a given interval, serial data that are input in response to each of a plurality of data clock signals, the plurality of data clock signals maintaining a constant phase difference between themselves and having mutually different phases. The unit 210 then outputs a plurality of sampling data Data0 to Data n. Operation and configuration of the data sampling unit 210 are the same as that of FIG. 6.

The edge sampling unit 245 includes a first edge sampling unit 240 and a second edge sampling unit 280 that operate alternately. The first edge sampling unit 240 outputs a first edge sampling signal Edge_1 in response to a selection edge clock signal CLK_edge_1 input at a first operation section.

The second edge sampling unit 280 outputs a second edge sampling signal Edge_2 in response to a selection edge clock signal CLK_edge_2 input at a second operation section consecutive to the first operation section.

The first and second operation sections are mutually successive sections and are alternately repeated every predetermined number of data periods, for example, every four data periods. The first operation section may be a section that the first edge sampling unit 240 operates, and the second operation may be a section that the second edge sampling unit 280 operates. Thus, the first edge sampling unit 240 and the second edge sampling unit 280 alternately repeat operation every predetermined number of data periods. That is, the units operate in an interleaving scheme.

The data selection unit 225 includes a first data selector 220 and a second data selector 260. The first data selector 220 operates at the first operation section, and selects at least two successive sampling data Data_S1 and Data_S2 that correspond to the first edge sampling signal Edge_, from among a plurality of sampling data Data0 to Data n. Basic operation in selecting sampling data Data_S1, Data_S2 is the same as that of FIGS. 6 and 7.

The second data selector 260 operates at the second operation section, and selects at least two successive sampling data Data_S3 and Data_S4 that correspond to the second edge sampling signal Edge_2, from among the plurality of sampling data Data0 to Data n. Basic operation in selecting sampling data Data_S3, Data_S4 is the same as that of FIGS. 6 and 7.

The first data selector 220 and the second data selector 260 alternately repeat operation whenever the first and second operation sections are repeated, thus operating in an interleaving scheme.

The decoding unit 235 includes a first decoder 230 and a second decoder 270. The first decoder 230 operates at the first operation section, and outputs transition information signal Hold_1 and phase control signal Early_1, Late_1 of sampling data Data_S1, Data_S2 selected in the first data selector 220. Similarly, the second decoder 270 operates at the second operation section, and outputs transition information signal Hold_2 and phase control signal Early_2, Late_2 of sampling data Data_S3, Data_S4 selected in the second data selector 260.

The first and second decoders 230 and 270 alternately repeat operation whenever the first and second operation sections are repeated, that is, in an interleaving scheme. The configuration and operation of the first decoder 230 and the second decoder 270 are the same as that of FIGS. 6 to 8.

The random edge clock generating unit 250 generates a selection phase clock signal CLK_edge_1, CLK-edge_2, each one being randomly selected every predetermined number of data periods from among phase clock signals that have mutually different phases and maintain a constant phase difference. In the selection phase clock signals CLK_edge_1 and CLK-edge_2, a first selection phase clock signal CLK_edge_1 is generated at the first operation section, and a second selection phase clock signal CLK-edge_2 is generated at the second operation section. The selection phase clock signals CLK_edge_1 and CLK-edge_2 do not have a limitation to the selection, and each one thereof is selected from the plurality of phase clock signals.

Figure 10:
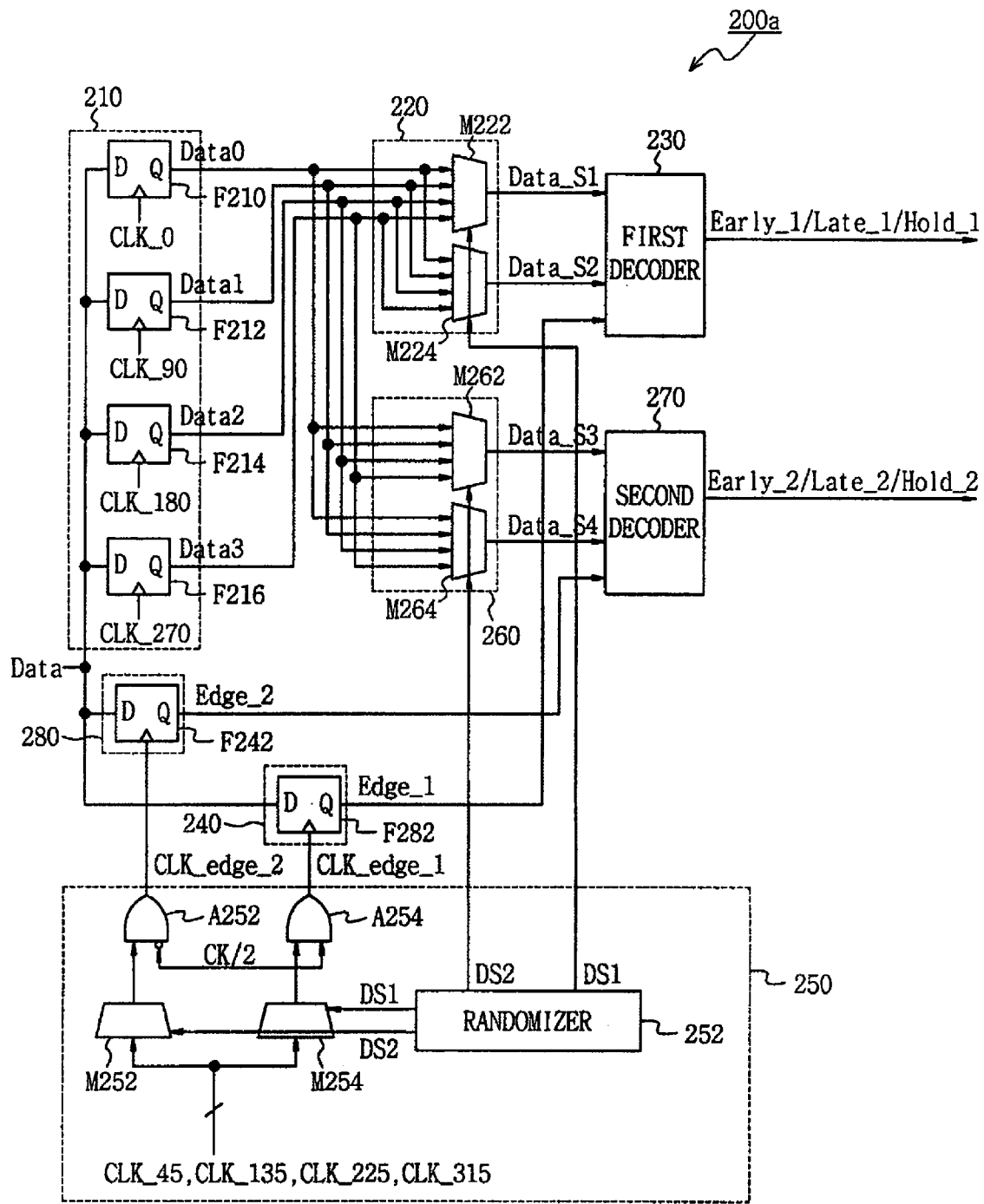
FIG. 10 is a circuit diagram of the CDR circuit shown in FIG. 9.

FIG. 10 is a circuit diagram of a circuit 200a realized from FIG. 9. Though FIG. 10 is provided just as one example for FIG. 9, the same reference numbers and characters are provided for respective blocks.

In the circuit diagram of FIG. 10, serial data of 4 bits is transmitted for each cycle of the reference clock signal CK, that is, every four data periods. Furthermore, first and second operation sections are alternately repeated, and for every operation section, each one of edge clock signals CLK_edge_1 and CLK_edge_2 is randomly selected. Alternatively, one skilled in the art will appreciate that multi-bit data may be transmitted in one cycle of the reference clock signal CK and that first and second operation sections are not necessarily repeated every four data periods. The repetition cycle of the first and second operation sections may be more or less than four data periods.

As shown in FIG. 10, the data sampling unit 210 includes four D flip-flop circuits F210, F212, F214 and F216, and operates in response to each of data clock signals CLK_0, CLK_90, CLK_180 and CLK_270 having different phases. This operation is the same as that described with respect to FIG. 8.

The first edge sampling unit 240 outputs edge sampling signal Edge_1 generated by sampling an edge of the serial data Data in response to a first selection edge clock signal CLK_edge_1 that is selected in the random edge clock generating unit 250. In an exemplary embodiment, the first edge sampling unit 240 may be realized as one D flip flop F282 responding to the first selection edge clock signal CLK_edge_1.

The second edge sampling unit 280 outputs edge sampling signal Edge_2 generated by sampling an edge of the serial data Data in response to a second selection edge clock signal CLK_edge_2 that is selected in the random edge clock generating unit 250 and is output. In an exemplary embodiment, the second edge sampling unit 280 may be realized as one D flip flop F242 responding to the second selection edge clock signal CLK_edge_2.

The random edge clock generating unit 250 randomly selects one edge clock signal every predetermined number of data periods (for example, every four data periods) from among a plurality of edge clock signals CLK_45, CLK_135, CLK_225 and CLK_315. Furthermore, in a first operation section, the first selection edge clock signal CLK_edge_1 is generated, and in a second operation section, the second selection edge clock signal CLK_edge_2 is generated. To this end, the random edge clock generating unit 250 includes a randomizer 252, multiplexer circuits M252 and M254, and AND circuits A252 and A254.

The randomizer 252 generates a first edge clock selection signal DS1 to generate the first selection edge clock signal CLK_edge_1 in the first operation section, and a second edge clock selection signal DS2 to generate the second selection edge clock signal CLK_edge_2 in the second operation section. The randomizer 252 has the same configuration as the randomizer of FIG. 7.

The multiplexer circuit M254 selects one edge clock signal from four edge clock signals CLK_45, CLK_135, CLK_225, and CLK_315 input in response to the first edge clock selection signal DS1, and outputs the signal to the AND circuit A254.

The multiplexer circuit M252 selects one edge clock signal from four edge clock signals CLK_45, CLK_135, CLK_225, and CLK_315 input in response to the second edge clock selection signal DS2, and outputs the signal to the AND circuit A252.

The AND circuit A254 performs a logical operation of an edge clock signal output from the multiplexer circuit M254 and a signal CK/2 whose cycle is twice the cycle of the reference clock signal CK. The first selection edge clock signal CLK_edge_1 is an output signal of the AND circuit A254, and is output when the signal CK/2 whose cycle is twice the cycle of the reference clock signal CK has a high level or a level of '1'. The first selection edge clock signal CLK_edge_1 is output in the first operation section.

The AND circuit A252 performs a logical operation of an edge clock signal output from the multiplexer circuit M252 and the signal CK/2 whose cycle is twice the cycle of the reference clock signal CK. The second selection edge clock signal CLK_edge_2 is an output signal of the AND circuit A252, and is output when the signal CK/2 whose cycle is twice the cycle of the reference clock signal CK has a low level or a level of '0'. The second selection edge clock signal CLK_edge_2 is output in the second operation section.

The first data selector 220 includes multiplexer circuits M222 and M224 to select at least two sampling data Data_S1 and Data_S2 generated in response to each of at least two data clock signals having a smallest phase difference from the first selection edge clock signal CLK_edge_1. The multiplexer circuits M222 and M224 can select two sampling data Data_S1 and Data_S2 in response to the first edge clock selection signal DS1.

For example, when the selection edge clock signal CLK_edge_1 is an edge clock signal CLK_45 having a phase of 45 degrees, data clock signals having a smallest phase difference from the edge clock signal CLK_45 are data clock signal CLK_0 having a phase of zero degrees and data clock signal CLK_90 having a phase of 90 degrees. Thus, sampling data Data0, Data1 generated in response to these data clock signals is selected as the sampling data Data_S1, Data_S2.

As another example, when the selection edge clock CLK_edge_1 is an edge clock signal CLK_135 having a phase of 135 degrees, sampling data Data1, Data2 is selected, and when the selection edge clock signal CLK_edge_1 is an edge clock signal CLK_225 having a phase of 225 degrees, sampling data Data2, Data3 is selected. Also, when the selection edge clock signal CLK_edge_1 is an edge clock signal CLK_315 having a phase of 315 degrees, sampling data Data3, Data0 is selected and output as Data_S1, Data_S2.

The second data selector 260 includes multiplexer circuits M262 and M264 to select at least two sampling data Data_S3, Data_S4 generated in response to each of at least two data clock signals having a smallest phase difference from the second selection edge clock signal CLK_edge_2. The multiplexer circuits M262 and M264 can select two sampling data Data_S3 and Data_S4 in response to the second edge clock selection signal DS2. The rest of the operation thereof is similar to that of the first data selector 220.

Figure 11:
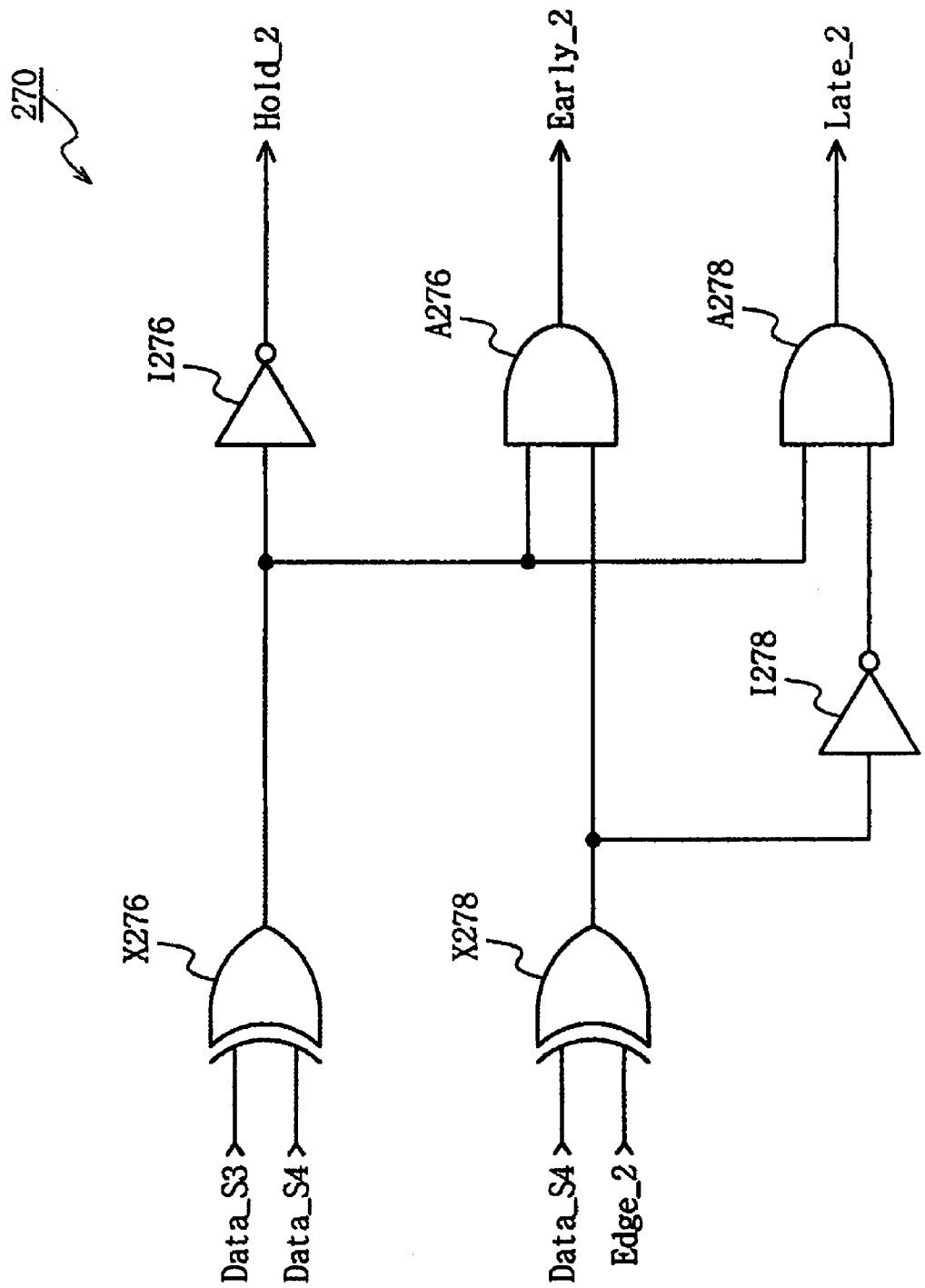
FIG. 11 is a circuit diagram of a second decoder shown in FIG. 10.

The first decoder 230 is the same as the configuration and operation of the decoding unit shown in FIG. 8, except operating in the first operation section, thus the description therefor will be omitted. Though the second decoder 270 has a similar configuration and operation, an example for it is illustrated in FIG. 11. As shown in FIG. 11, the second decoder 270 includes XOR circuits X276 and X278, AND circuits A276 and A278, and inverter circuits I276 and I278. The second decoder 270 operates in the second operation section.

The XOR circuit X276 outputs a result from a logical operation of at least two sampling data Data_S3 and Data_S4 selected in the second data selector 260. For example, when data values of the sampling data Data_S3 and Data_S4 are different, '1' is output, and when having the same value, '0' is output. Based on these outputs, a decision may be made as to whether successive sampling data Data_S3 and Data_S4 undergo a transition.

The XOR circuit X278 logically operates on any one sampling data Data_S4 from at least two sampling data Data_S3 and Data_S4 selected in the second data selector 260, and the second edge sampling signal Edge_2, and outputs the operation result. That is, when the selected sampling data Data_S4 and the second edge sampling signal Edge_2 have different values, '1' is output, and when having the same value, '0' is output.

The AND circuit A276 logically operates an output signal of the XOR circuit X276 and an output signal of the XOR circuit X278, and outputs a first phase control signal Early_2. In particular, when the first phase control signal Early_2 has a value of '1', it may indicate to be faster/slower as compared with data having an input of phase. Furthermore, the AND circuit A278 logically operates an output signal of the XOR circuit X276 and an inverted signal of output signal of the XOR circuit X278, and outputs a second phase control signal Late_2. To that end, the second decoder 270 may further include an inverter circuit I278.

The inverter circuit I276 inverts an output signal of the XOR circuit X276, and outputs a hold signal Hold_2 having transition information of selected sampling data Data_S3, Data_S4.

When the hold signal Hold-2 has a value of '1', it may indicate that transition did not occur between the selected sampling data Data_S3 and Data_S4, and when having a value of '0', it may indicate that transition occurred between the selected sampling data Data_S3 and Data_S4.

Figure 3:
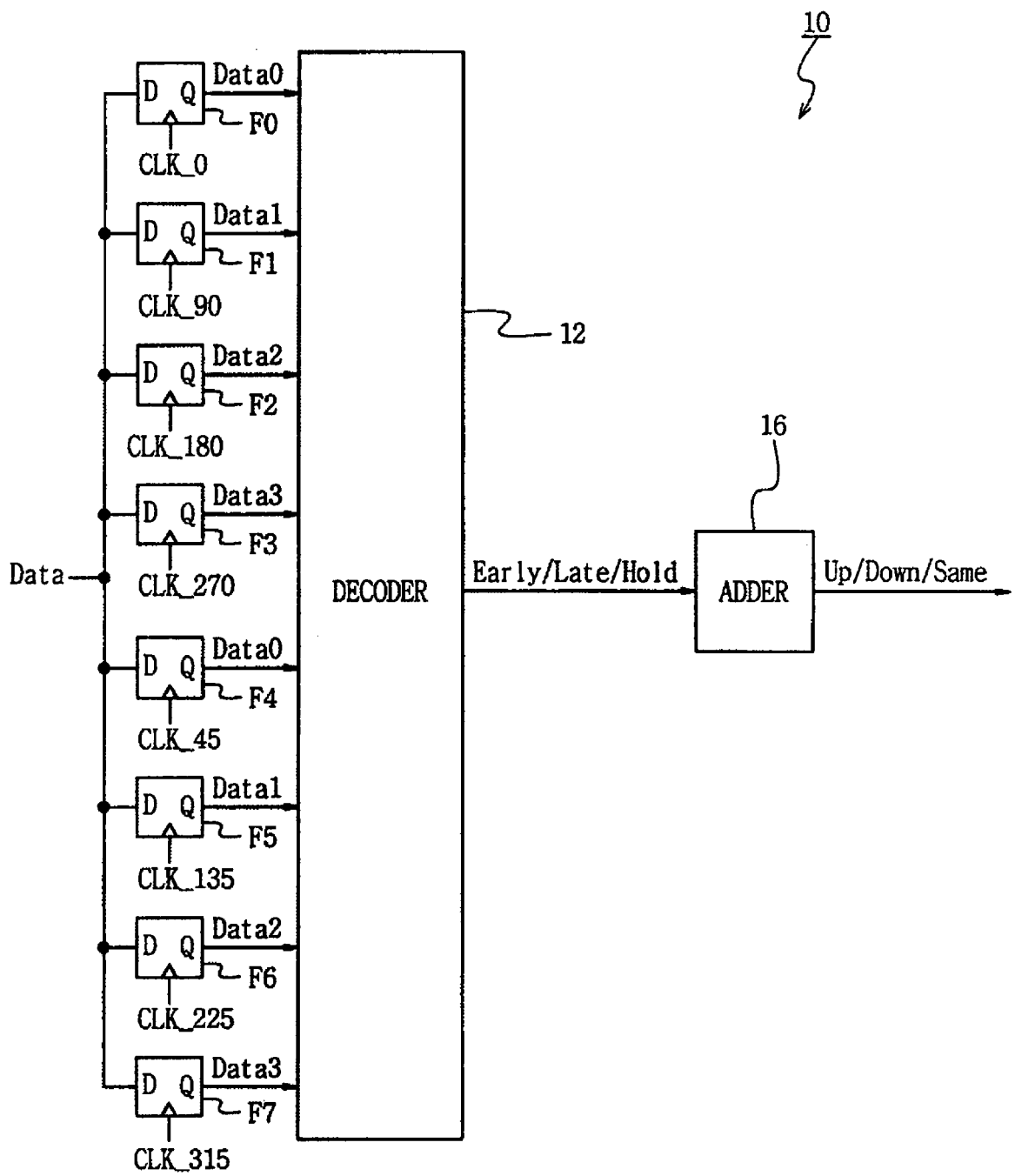
FIG. 3 is a block diagram of a conventional art phase detector.
Figure 4:
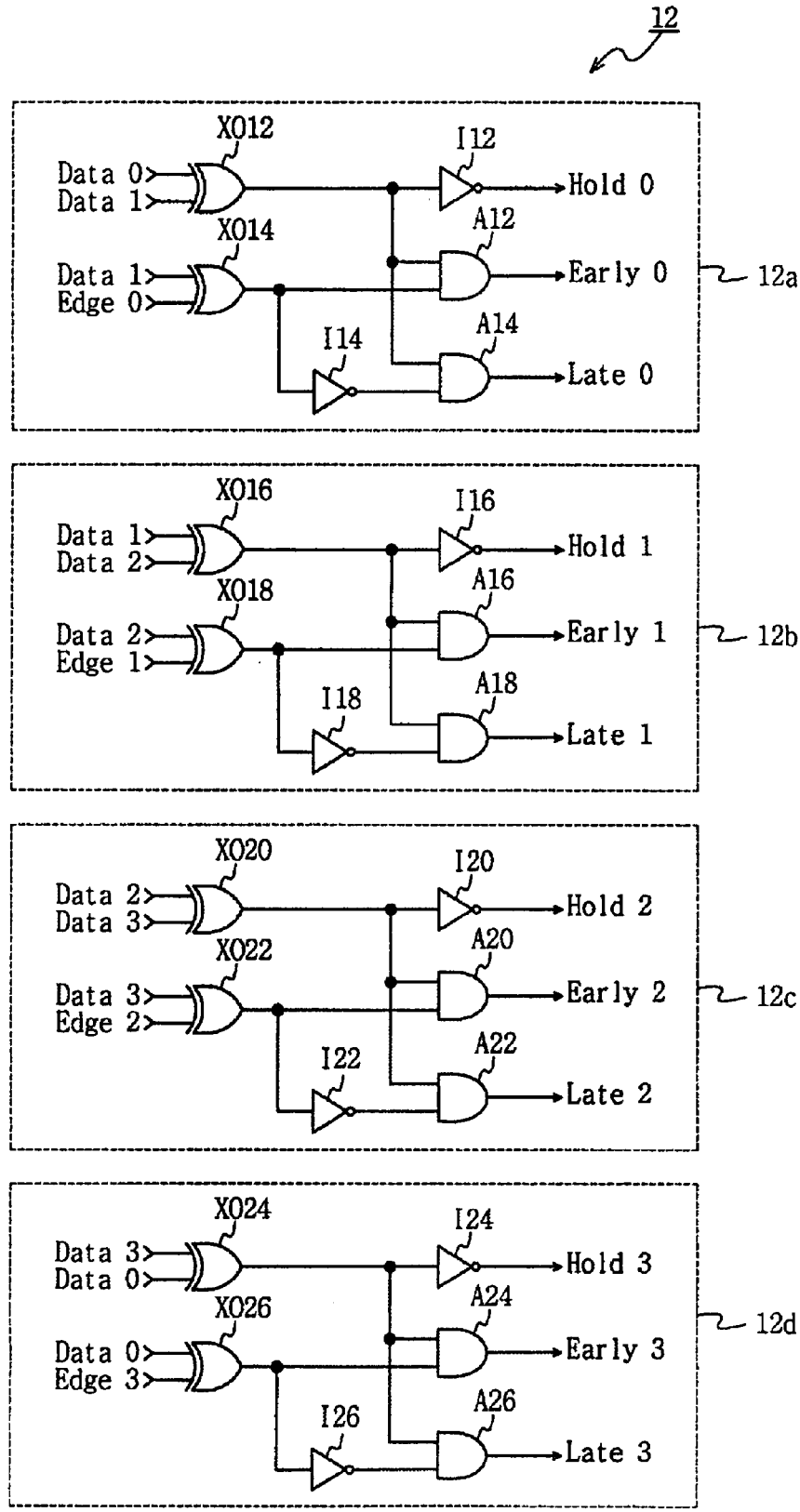
FIG. 4 is a circuit diagram of a decoder shown in FIG. 3.
Figure 5:
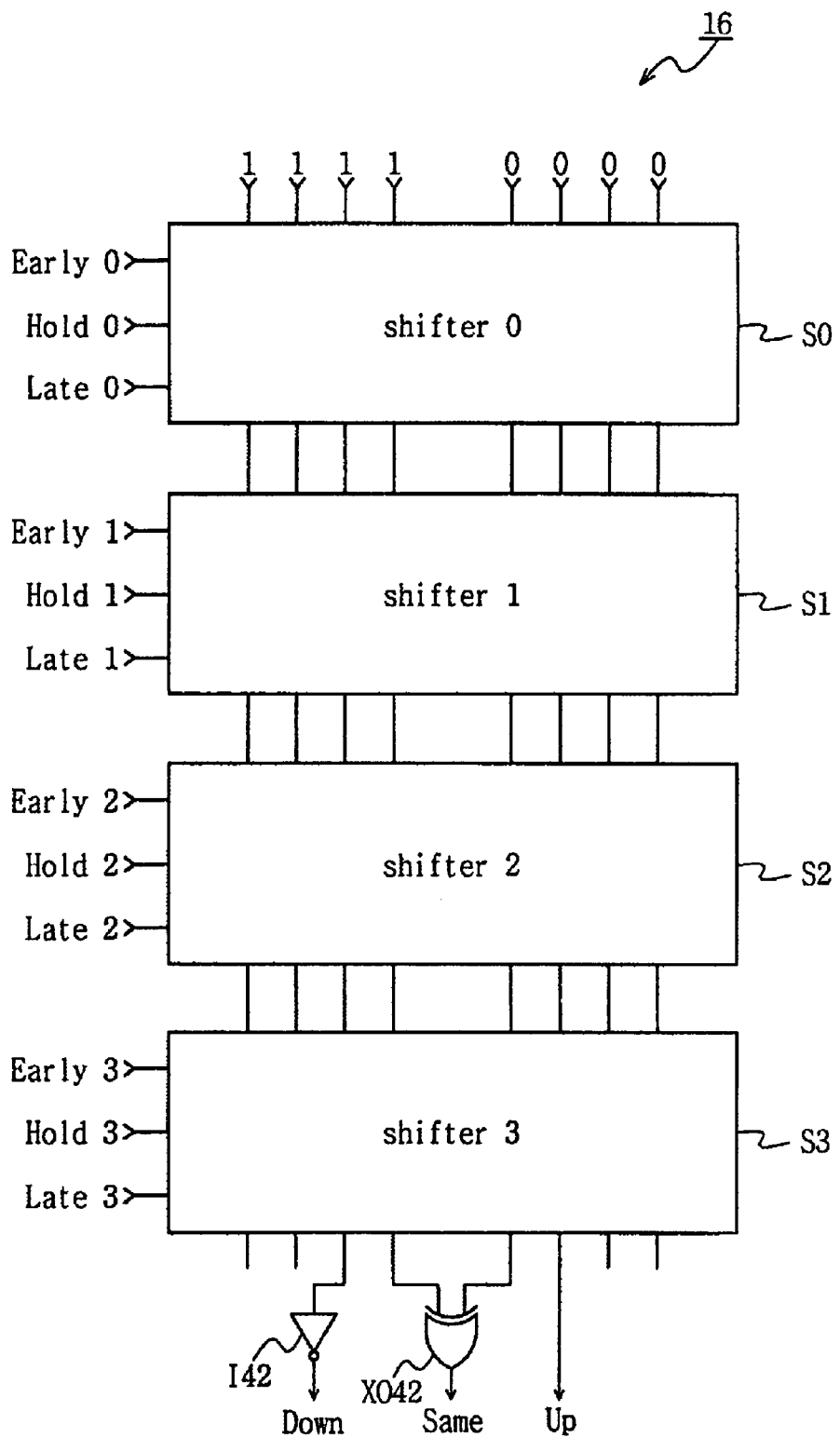
FIG. 5 is a circuit diagram of an adder shown in FIG. 3.

The phase control signals Early_2 and Late_2 are synthesized through the adder 16 like in FIG. 3, and may be used as phase control information.

Figure 12:
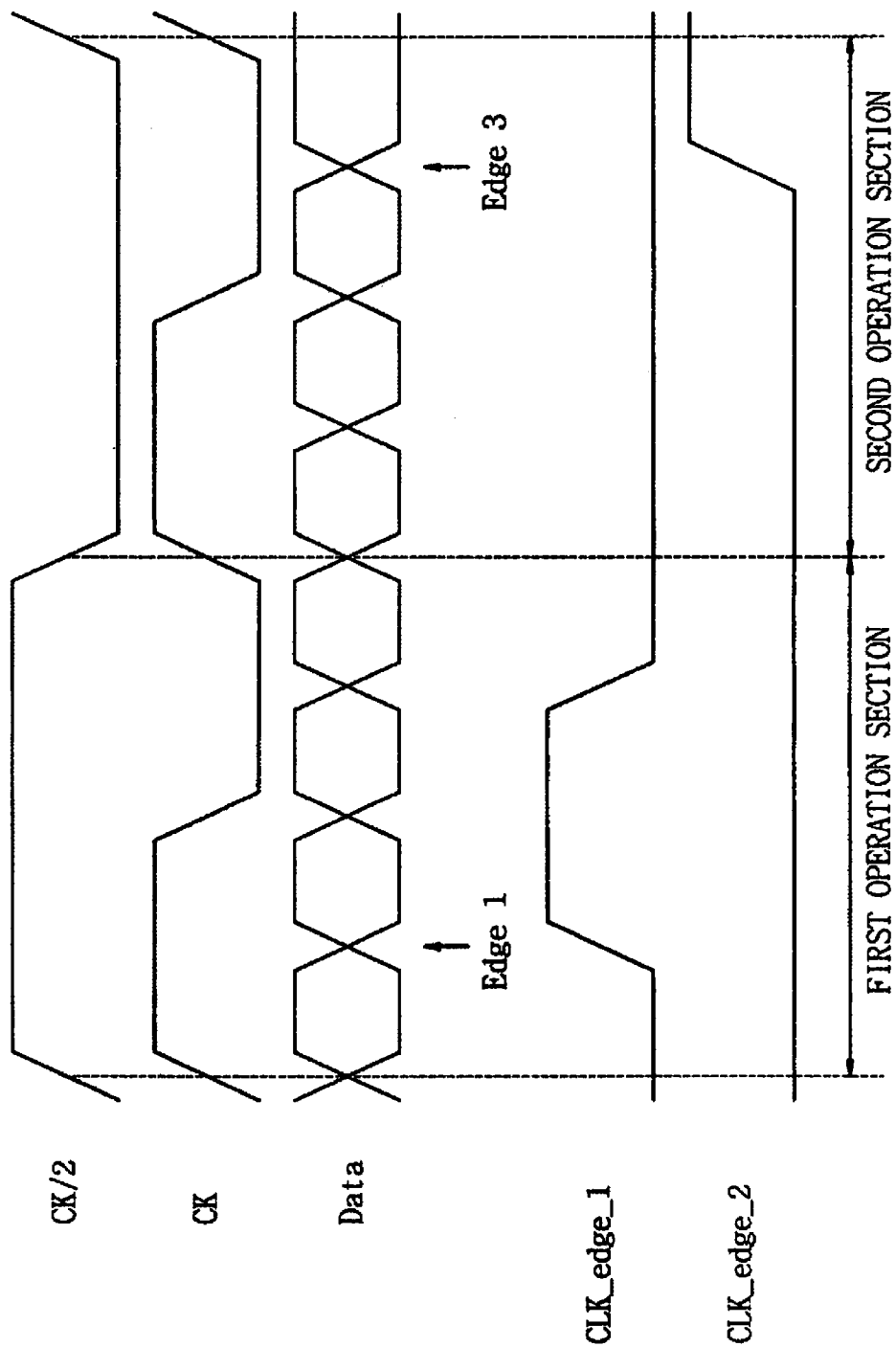
FIG. 12 illustrates operation timings of FIG. 10.

FIG. 12 provides timings for operation of the circuit of FIG. 10. As shown in FIG. 12, a first operation section indicates a high level section of a clock signal CK/2 whose cycle is twice the cycle of the reference clock signal CK, and a second operation section indicates a low level section.

Figure 2:
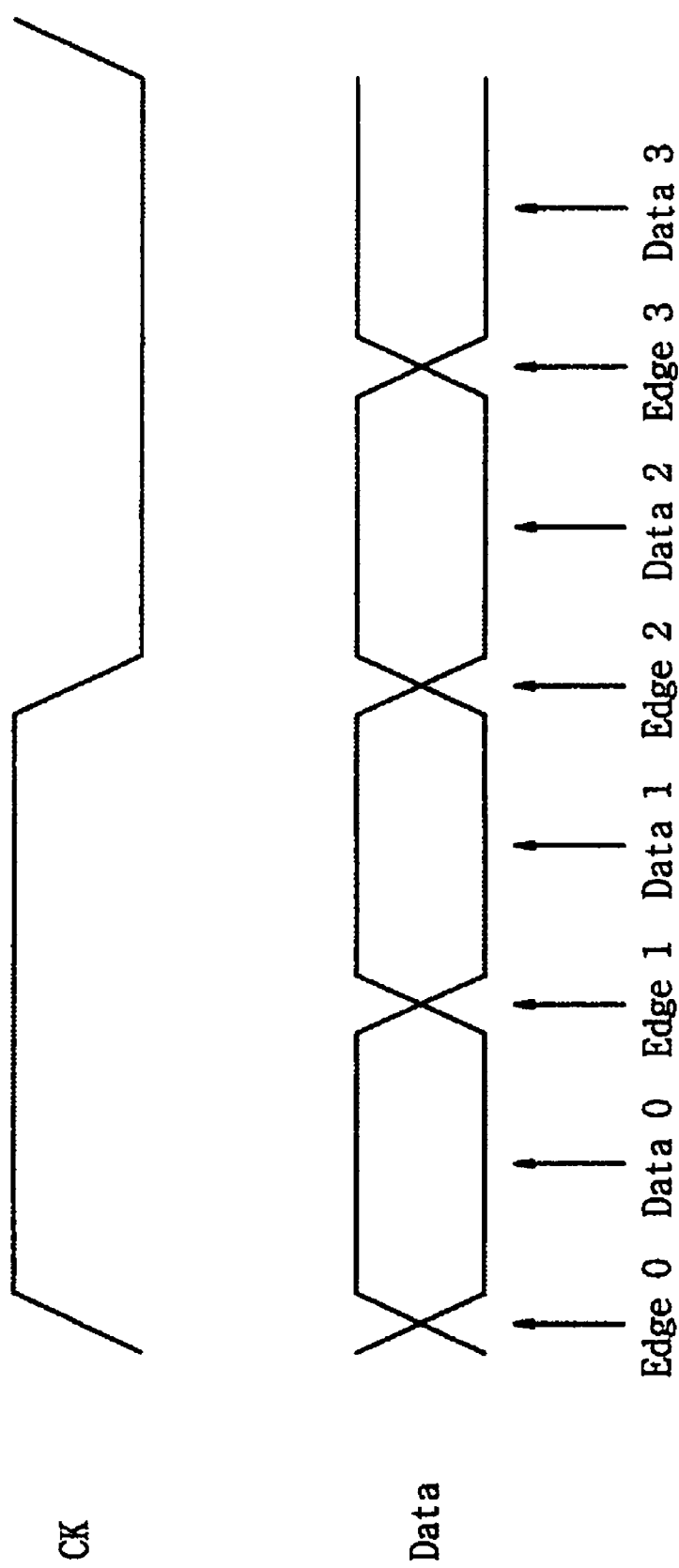
FIG. 2 illustrates operation timings of a CDR circuit of FIG. 1.

At this time, 4 bit data is transmitted for one cycle of the reference clock signal CK. One cycle of the reference clock corresponds to four data periods herein. The sampling of data is the same as that performed in the conventional art, i.e., as performed in FIG. 2.

In the first operation section, an edge clock signal CLK_135 having a phase of 135 degrees randomly selected from a plurality of edge clock signals CLK_45, CLK_135, CLK_225, and CLK_315 is selected, and is generated as a first selection edge clock signal CLK_edge_1. Then, a first edge sampling signal Edge_1 is generated. Since the edge clock signal CLK_135 having a phase of 135 degrees is selected from the edge clock signals CLK_45, CLK_135, CLK_225, and CLK_315, 'Edge1' is generated as the first edge sampling signal Edge_1, as shown in FIG. 12, and has edge information between a 0$^{th}$ data Data0 and a first data Data1.

In the second operation section, an edge clock signal CLK_315 having a phase of 315 degrees randomly selected from a plurality of edge clock signals CLK_45, CLK_135, CLK_225, and CLK_315 is selected, and is generated as a second selection edge clock signal CLK_edge_2. Then a second edge sampling signal Edge_2 is generated. Since the edge clock signal CLK_315 having a phase of 315 degrees is selected from the edge clock signals CLK_45, CLK_135, CLK_225, and CLK_315, 'Edge3' is generated as the second edge sampling signal Edge_2 as shown in FIG. 12, and has edge information between a second data Data2 and a third data Data3. Then, operation in the first and second operation sections is performed repeatedly.

As described above, effective operation can be obtained by performing an edge sampling in an interleaving scheme, and power consumption can be reduced without compromising on the performance of the CDR circuit. Furthermore, an area occupied by the circuit can be reduced.

It will be apparent to those skilled in the art that modifications and variations can be made in the present invention without deviating from the spirit or scope of the invention. Thus, it is intended that the present invention cover any such modifications and variations of this invention provided they come within the scope of the appended claims and their equivalents. Accordingly, these and other changes and modifications are seen to be within the true spirit and scope of the invention as defined by the appended claims.

What is claimed is:

1. A clock and data recovery (CDR) circuit comprising:
   a data sampling unit which latches serial data input in response to data clock signals, and outputs a plurality of sampling data, the data clock signals maintaining a constant phase difference and having mutually different phases;
   an edge sampling unit which outputs an edge sampling signal generated by sampling edge information of the serial data in response to a selection edge clock signal, the selection edge clock signal being randomly selected from among a plurality of edge clock signals, the plurality of edge clock signals maintaining a constant phase difference, having mutually different phases, and having phases individually different from the data clock signals;
   a data selection unit which selects at least two consecutive sampling data from among the plurality of sampling data, the at least two selected sampling data corresponding to the edge sampling signal output from the edge sampling unit;
   a decoding unit which performs a logical operation of the sampling data selected by the data selection unit and the edge sampling signal, and outputs a transition information signal of the sampling data selected by the data selection unit and a phase control signal; and
   a random edge clock generating unit which generates the selection edge clock signal based on a random selection from among the plurality of edge clock signals.

2. The circuit of claim 1, wherein the random edge clock generating unit comprises:
   a randomizer which generates an edge clock selection signal to randomly generate the selection edge clock signal every predetermined number of data periods; and
   a multiplexer circuit which selects one edge clock signal of the plurality of edge clock signals in response to the edge clock selection signal.

3. The circuit of claim 2, wherein the data selection unit comprises multiplexer circuits which select at least two sampling data in response to the edge clock selection signal, the at least two sampling data being generated in response to each of at least two data clock signals that have a smallest phase difference from the selection edge clock signal.

4. The circuit of claim 3, wherein the data clock signals and the edge clock signals have a phase difference corresponding to the data period.

5. The circuit of claim 4, wherein the data clock signals and the edge clock signals alternately have a phase difference of a half value of the data period.

6. A clock and data recovery (CDR) circuit comprising:
   a data sampling unit which latches serial data input in response to data clock signals, and outputs a plurality of sampling data, the data clock signals maintaining a constant phase difference and having mutually different phases;
   an edge sampling unit which outputs an edge sampling signal generated by sampling edge information of the serial data in response to a selection edge clock signal, the selection edge clock signal being randomly selected from among a plurality of edge clock signals, the plurality of edge clock signals maintaining a constant phase difference, having mutually different phases, and having phases individually different from the data clock signals;

a data selection unit which selects at least two consecutive sampling data from among the plurality of sampling data, the at least two selected sampling data corresponding to the edge sampling signal output from the edge sampling unit; and a decoding unit which performs a logical operation of the sampling data selected by the data selection unit and the edge sampling signal, and outputs a transition information signal of the sampling data selected by the data selection unit and a phase control signal;

wherein the data sampling unit comprises a plurality of D flip flops which individually latch, within an interval, serial data input in response to each of the data clock signals.

7. A clock and data recovery (CDR) circuit comprising:

a data sampling unit which latches serial data input in response to data clock signals, and outputs a plurality of sampling data, the data clock signals maintaining a constant phase difference and having mutually different phases;

an edge sampling unit which outputs an edge sampling signal generated by sampling edge information of the serial data in response to a selection edge clock signal, the selection edge clock signal being randomly selected from among a plurality of edge clock signals, the plurality of edge clock signals maintaining a constant phase difference, having mutually different phases, and having phases individually different from the data clock signals;

a data selection unit which selects at least two consecutive sampling data from among the plurality of sampling data, the at least two selected sampling data corresponding to the edge sampling signal output from the edge sampling unit; and a decoding unit which performs a logical operation of the sampling data selected by the data selection unit and the edge sampling signal, and outputs a transition information signal of the sampling data selected by the data selection unit and a phase control signal;

wherein the edge sampling unit comprises one D-flip flop circuit which outputs the edge sampling signal in response to the selection edge clock signal.

8. A clock and data recovery (CDR) circuit comprising:

a data sampling unit which latches serial data input in response to data clock signals, and outputs a plurality of sampling data, the data clock signals maintaining a constant phase difference and having mutually different phases;

an edge sampling unit which outputs an edge sampling signal generated by sampling edge information of the serial data in response to a selection edge clock signal, the selection edge clock signal being randomly selected from among a plurality of edge clock signals, the plurality of edge clock signals maintaining a constant phase difference, having mutually different phases, and having phases individually different from the data clock signals;

a data selection unit which selects at least two consecutive sampling data from among the plurality of sampling data, the at least two selected sampling data corresponding to the edge sampling signal output from the edge sampling unit; and a decoding unit which performs a logical operation of the sampling data selected by the data selection unit and the edge sampling signal, and outputs a transition information signal of the sampling data selected by the data selection unit and a phase control signal;

wherein the decoding unit comprises:

a first XOR circuit which performs a logical operation on the at least two sampling data selected by the data selection unit;

a second XOR circuit which performs a logical operation on any one of the at least two sampling data selected by the data selection unit, and the edge sampling signal;

a first AND circuit which performs a logical operation on an output signal of the first XOR circuit and an output signal of the second XOR circuit, and outputs a first phase control signal;

a second AND circuit which performs a logical operation on the output signal of the first XOR circuit and an inverted signal of the output signal of the second XOR circuit, and outputs a second phase control signal; and an inverter circuit which inverts the output signal of the first XOR circuit, and outputs a hold signal having transition information on whether transition has occurred between the at least two sampling data.

9. A clock and data recovery (CDR) circuit comprising:

a data sampling unit which latches serial data input in response to data clock signals, and outputs a plurality of sampling data, the data clock signals maintaining a constant phase difference and having mutually different phases;

an edge sampling unit which outputs an edge sampling signal generated by sampling edge information of the serial data in response to a selection edge clock signal, the selection edge clock signal being randomly selected from among a plurality of edge clock signals, the plurality of edge clock signals maintaining constant phase difference, having mutually different phases, and having phases individually different from the data clock signals;

a data selection unit which selects at least two consecutive sampling data from among the plurality of sampling data, the at least two selected sampling data corresponding to the edge sampling signal output from the edge sampling unit; and a decoding unit which performs a logical operation of the sampling data selected by the data selection unit and the edge sampling signal, and outputs a transition information signal of the sampling data selected by the data selection unit and a phase control signal;

wherein the phase control signal is input to one of a controller of a semiconductor device employing the CDR circuit, to control an input phase of the serial data and a phase locked loop (PLL) circuit, to control phases of the data clock signals and the edge clock signals.

10. A clock and data recovery (CDR) circuit comprising:

a data sampling unit which latches serial data input in response to data clock signals, and outputs a plurality of sampling data, the data clock signals maintaining a constant phase difference and having mutually different phases;

an edge sampling unit which outputs an edge sampling signal generated by sampling edge information of the serial data in response to a selection edge clock signal, the selection edge clock signal being randomly selected from among a plurality of edge clock signals, the plurality of edge clock signals maintaining a constant phase difference, having mutually different phases, and having phases individually different from the data clock signals;

a data selection unit which selects at least two consecutive sampling data from among the plurality of sampling data, the at least two selected sampling data corresponding to the edge sampling signal output from the edge sampling unit; and a decoding unit which performs a logical operation of the sampling data selected by the data selection unit and the edge sampling signal, and outputs a transition information signal of the sampling data selected by the data selection unit and a phase control signal;

wherein the edge sampling unit comprises a first edge sampling unit which outputs a first edge sampling signal in response to a selection edge clock signal input in a first operation section, and a second edge sampling unit which outputs a second edge sampling signal in response to a selection edge clock signal input in a second operation section consecutive to the first operation section.

11. The circuit of claim 10, wherein the first and second operation sections each have a time interval corresponding to a predetermined number of data periods and are repeated alternately.

12. The circuit of claim 11, wherein the data selection unit comprises:

a first data selector operating in the first operation section, which selects at least two consecutive sampling data corresponding to the first edge sampling signal from the plurality of sampling data; and a second data selector operating in the second operation section, which selects at least two consecutive sampling data corresponding to the second edge sampling signal from the plurality of sampling data.

13. The circuit of claim 12, wherein the first data selector comprises multiplexer circuits which select at least two sampling data generated in response to each of at least two data clock signals having a smallest phase difference from the selection edge clock signal input in the first operation section, and the second data selector comprises multiplexer circuits which select at least two sampling data generated in response to each of at least two data clock signals having a smallest phase difference from the selection edge clock signal input in the second operation section.

14. The circuit of claim 12, wherein the decoding unit comprises:

a first decoder operating in the first operation section, which outputs a transition information signal and a phase control signal from the at least two sampling data selected by the first data selector; and a second decoder operating in the second operation section, which outputs a transition information signal and a phase control signal from the at least two sampling data selected by the second data selector.

15. The circuit of claim 14, wherein the first decoder comprises:

(a) an XOR circuit which performs a logical operation on the at least two sampling data selected by the first data selector;

(b) an XOR circuit which performs a logical operation on any one of the at least two sampling data selected by the first data selector, and the first edge sampling signal;

(c) an AND circuit which performs a logical operation on output signals of the XOR circuits and outputs a first phase control signal;

(d) an AND circuit which performs a logical operation on an output signal of any one of the XOR circuits and an inverted signal of an output signal of the remaining XOR circuit, and outputs a second phase control signal; and (e) an inverter circuit which inverts an output signal of the XOR circuit which performs a logical operation on the at least two sampling data selected by the first data selector, and outputs a hold signal having transition information on whether transition has occurred between the at least two sampling data, and wherein the second decoder comprises:

(a) an XOR circuit which performs a logical operation on the at least two sampling data selected by the second data selector;

(b) an XOR circuit which performs a logical operation on any one of the at least two sampling data selected by the second data selector, and the second edge sampling signal;

(c) an AND circuit which performs a logical operation on output signals of the XOR circuits and outputs a first phase control signal;

(d) an AND circuit which performs a logical operation on an output signal of any one of the XOR circuits and an inverted signal of an output signal of the remaining XOR circuit, and outputs a second phase control signal; and (e) an inverter circuit which inverts an output signal of the XOR circuit which performs a logical operation on the at least two sampling data selected by the second data selector, and outputs a hold signal having transition information on whether transition has occurred between the at least two sampling data.

16. A clock and data recovery method comprising:

outputting an edge sampling signal generated by sampling edge information of serial data in response to a selection edge clock signal randomly selected from among a plurality of edge clock signals, the plurality of edge clock signals maintaining a constant phase difference and having mutually different phases;

individually latching the serial data and outputting a plurality of sampling data;

selecting at least two sampling data having a smallest phase difference from the edge clock signal from among the plurality of sampling data;

performing a logical operation on the selected at least two sampling data and the edge sampling signal, and generating a transition information signal of the selected at least two sampling data and a phase control signal; and generating phase control signals to control one of an input phase of the serial data and phases of the edge clock signals and data clock signals;

wherein the edge sampling signals are generated independently during a first operation section and during a second operation section, the first and second operation section each having a time interval corresponding to a predetermined number of data periods and being repeated alternately.

17. The method of claim 16, wherein the phase control signals are generated independently during the first operation section and during the second operation section.

* * * * *